United States Patent
Kleine et al.

(10) Patent No.: US 12,252,973 B2
(45) Date of Patent: Mar. 18, 2025

(54) MODELING DIFFUSION AND EXPULSION OF HYDROCARBONS IN KEROGEN

(71) Applicant: Schlumberger Technology Corporation, Sugar Land, TX (US)

(72) Inventors: Adrian Kleine, Aachen (DE); Christian Vogt, Aachen (DE); Thomas Hantschel, Aachen (DE)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 820 days.

(21) Appl. No.: 17/593,022

(22) PCT Filed: Mar. 6, 2020

(86) PCT No.: PCT/US2020/021369
§ 371 (c)(1),
(2) Date: Sep. 3, 2021

(87) PCT Pub. No.: WO2020/181184
PCT Pub. Date: Sep. 10, 2020

(65) Prior Publication Data
US 2022/0178236 A1    Jun. 9, 2022

Related U.S. Application Data

(60) Provisional application No. 62/814,768, filed on Mar. 6, 2019.

(51) Int. Cl.
*E21B 43/267*     (2006.01)
*E21B 43/08*     (2006.01)
(Continued)

(52) U.S. Cl.
CPC .......... *E21B 43/267* (2013.01); *E21B 43/082* (2013.01); *E21B 43/27* (2020.05); *G01V 20/00* (2024.01); *G01V 2210/66* (2013.01)

(58) Field of Classification Search
CPC ...... E21B 43/267; E21B 43/27; E21B 43/082; G01V 20/00; G01V 2210/66
See application file for complete search history.

(56) References Cited

U.S. PATENT DOCUMENTS

| | | |
|---|---|---|
| 10,458,894 B2 | 10/2019 | Xu et al. |
| 2013/0124173 A1 | 5/2013 | Lu et al. |

(Continued)

FOREIGN PATENT DOCUMENTS

| | | |
|---|---|---|
| GB | 2568155 A | 5/2019 |
| WO | 2013089784 A1 | 6/2013 |

(Continued)

OTHER PUBLICATIONS

Peters KE, Schenk O, Hosford Scheirer A, Wygrala B, Hantschel T. Basin and petroleum system modeling. Springer handbook of petroleum technology. 2017:381-417. (Year: 2017).*

(Continued)

*Primary Examiner* — Chuen-Meei Gan
(74) *Attorney, Agent, or Firm* — Jeffrey D. Frantz (57) ABSTRACT

A method, comprising receiving input data representing a subterranean formation, defining a grid representing the input data, with the grid including cells. The method also includes identifying at least one of the cells in which kerogen is present based on the input data, simulating hydrocarbon movement within the kerogen using the grid, and generating a model of hydrocarbon expulsion to pore space based on the simulating.

20 Claims, 5 Drawing Sheets

(51) Int. Cl.
 *E21B 43/27* (2006.01)
 *G01V 20/00* (2024.01)

(56) References Cited

U.S. PATENT DOCUMENTS

| | | | |
|---|---|---|---|
| 2016/0004802 A1 | 1/2016 | Herrmann et al. | |
| 2018/0045046 A1 | 2/2018 | Stone et al. | |
| 2019/0196058 A1* | 6/2019 | Kumar | G01V 20/00 |
| 2022/0034213 A1* | 2/2022 | Hou | E21B 43/30 |

FOREIGN PATENT DOCUMENTS

| | | |
|---|---|---|
| WO | 2013158089 A1 | 10/2013 |
| WO | 2014186545 A1 | 11/2014 |

OTHER PUBLICATIONS

Shabro, Vahid, Carlos Torres-Verdín, and Kamy Sepehrnoori. "Forecasting gas production in organic shale with the combined numerical simulation of gas diffusion in kerogen, Langmuir desorption from kerogen surfaces, and advection in nanopores." In SPE Annual Technical Conference and Exhibition, pp. SPE (Year: 2012).*

Le TD, Murad MA. A new multiscale model for flow and transport in unconventional shale oil reservoirs. Applied Mathematical Modelling. Dec. 1, 2018;64:453-79 (Year: 2018).*

Stainforth, J. G et al., "Primary migration of hydrocarbons by diffusion through organic matter networks, and its effect on oil and gas generation", Advances in Organic Geochemistry, 1990, 16(1-3), pp. 61-74.

Stainforth, J. G., "Practical kinetic modeling of petroleum generation and expulsion", Marine and Petroleum Geology, 2009, 26, pp. 552-572.

Search Report and Written Opinion of related International Patent Application No. PCT/US2020/021369 mailed May 8, 2020.

Extended Search Report issued in European Patent Application No. 20765818.8 dated Oct. 21, 2022, 10 pages.

Shabro, V. et al., "Forecasting Gas Production in Organic Shale with the Combined Numberical Simulation of Gas Diffusion in Kerogen, and Advection in Nanopores", SPE 159250, presented at the SPE Annual Technical Conference and Exhibition, San Antonio, Texas, USA, 2012, pp. 8-10.

Javadpour, F. et al., "Nanoscale Gas Flow in Shale Gas Sediments", Journal of Canadian Petroleum Technology, 2007, 46(10), 7 pages.

* cited by examiner

MODELING DIFFUSION AND EXPULSION OF HYDROCARBONS IN KEROGEN

CROSS-REFERENCE TO RELATED APPLICATIONS

This application is a National Stage and claims benefit of PCT Patent Application No. PCT/US2020/021369, entitled "Modeling Diffusion and Expulsion of Hydrocarbons in Kerogen," filed on Mar. 6, 2020, which claims priority to U.S. Provisional Patent Application No. 62/814,768, entitled "Modeling Kerogen Diffusion in Petroleum Systems," filed on Mar. 6, 2019, and which is incorporated herein by reference in its entirety.

BACKGROUND

Petroleum systems modeling is used to predict the generation and expulsion of hydrocarbons from organic-rich source rocks in a subterranean formation to a pore space, reservoir, or the like. That is, petroleum systems modeling may be used to predict the migration of hydrocarbons from the source rocks into reservoirs and the trapping and/or sealing capabilities of the reservoirs (e.g., for oil and gas recovery). Kerogen is a solid organic matter that, when heated, converts in part to liquid and gaseous hydrocarbons. As such, hydrocarbons may diffuse from kerogen to the pore space.

SUMMARY

Embodiments of the present disclosure may provide a method including receiving input data representing a subterranean formation, defining a grid representing the input data, the grid including cells, identifying at least one of the cells in which kerogen is present based on the input data, simulating hydrocarbon movement within the kerogen using the grid, and generating a model of hydrocarbon expulsion to pore space based on the simulating.

Embodiments of the disclosure may also include a computing system including one or more processors, and a memory system having one or more non-transitory computer-readable media storing instructions that, when executed by at least one of the one or more processors, cause the computing system to perform operations. The operations include receiving input data representing a subterranean formation, defining a grid representing the input data, the grid including cells, identifying at least one of the cells in which kerogen is present based on the input data, simulating hydrocarbon movement within the kerogen using the grid, and generating a model of hydrocarbon expulsion to pore space based on the simulating.

Embodiments of the disclosure may further provide a non-transitory, computer-readable medium storing instructions that, when executed by at least one processor of a computing system, cause the computing system to perform operations. The operations include receiving input data representing a subterranean formation, defining a grid representing the input data, the grid including cells, identifying at least one of the cells in which kerogen is present based on the input data, simulating hydrocarbon movement within the kerogen using the grid, and generating a model of hydrocarbon expulsion to pore space based on the simulating.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Petroleum systems modeling is used to predict the generation and expulsion of hydrocarbons from organic-rich source rocks in a subterranean formation to pore space. Hydrocarbon generation in source rocks, as well as secondary cracking reactions, may be either, (a) absorbed inside the kerogen, (b) adsorbed between kerogen surface and pore space surface, and/or (c) expelled into the pore space.

Existing techniques in the petroleum systems modeling domain do not model hydrocarbon diffusive transport processes for hydrocarbons within kerogen (e.g., hydrocarbons that have been absorbed inside kerogen). More specifically, existing techniques in the petroleum systems modeling domain do not model hydrocarbon migration (e.g., expulsion) from the kerogen to pore space. Accordingly, aspects of the present disclosure may include a system and/or technique for accurately modeling hydrocarbon diffusive transport processes within kerogen (e.g., expulsion of hydrocarbons absorbed within kerogen). As a result, prediction of the generation and expulsion of hydrocarbons from organic-rich source rocks is improved using the techniques described herein. More specifically, by modeling hydrocarbon diffusive transport processes within kerogen, the amount of hydrocarbons diffused from the kerogen to the pore space may be determined. In some embodiments, the modeled hydrocarbon expulsion may be used as an input to another model used to model total hydrocarbon migration (e.g., hydrocarbons originating from kerogen and/or other sources).

The systems and methods described herein provide an approach allowing diffusive transport processes to be incorporated into petroleum systems modeling. This may enable a petroleum system modeler to quantify kerogen diffusion effects in organic source rocks, yielding substantially better predictions of hydrocarbon volumes and benefits/risks of recovery. This may also improve predictions of hydrocarbon quality, such as API gravity and/or gas-oil ratio (GOR). The systems and methods described herein can be used for both conventional petroleum systems and unconventional petroleum systems (e.g., containing shale oil). In addition, the systems and methods disclosed herein may improve the reliability of the results of basin and petroleum system modeling.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
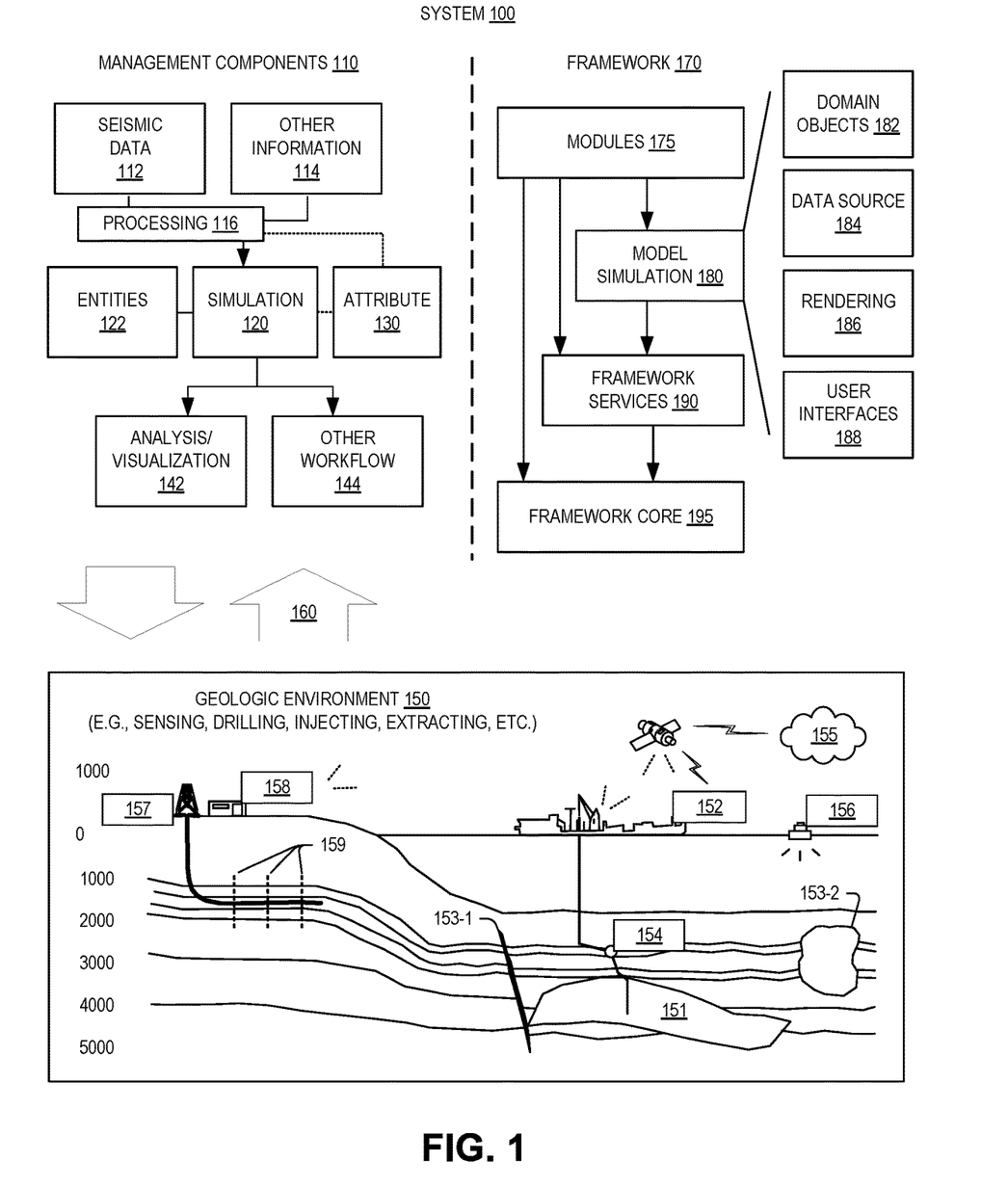
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
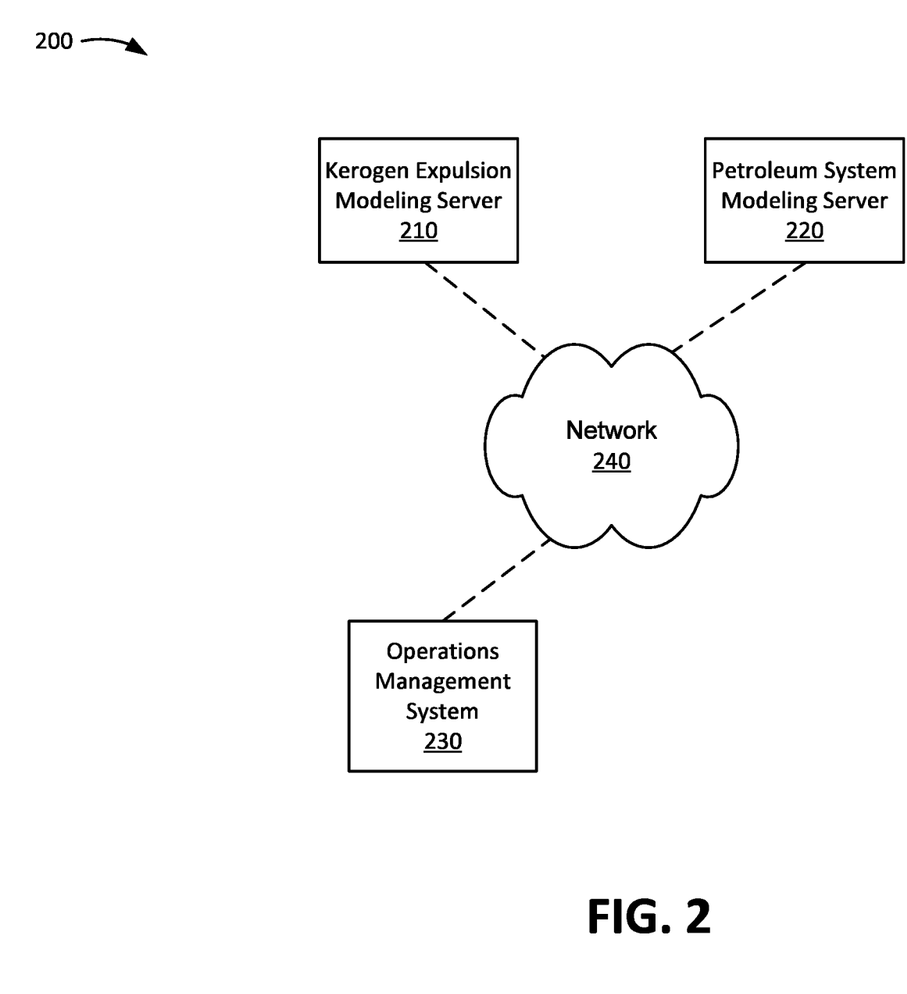
FIG. 2 illustrates an example environment in accordance with aspects of the present disclosure.

FIG. 2 illustrates an example environment in accordance with aspects of the present disclosure. As shown in FIG. 2, environment 200 includes a kerogen expulsion modeling server 210, a petroleum system modeling server 220, an operations management server 230, and a network 240.

The kerogen expulsion modeling server 210 may include one or more computing devices that models expulsion, diffusion, migration, and/or transport processes of hydrocarbons within kerogen. In some embodiments, the kerogen expulsion modeling server 210 may receive a petroleum systems model from the petroleum system modeling server 220, identify cells in the petroleum systems model in which kerogen is present, simulate hydrocarbon movement within the kerogen, model hydrocarbon movement and hydrocarbon diffusion to pore space, and output the modeled hydrocarbon movement and diffusion (e.g., to the petroleum system modeling server 220 and/or the operations management server 230). By modeling the hydrocarbon movement, diffusion, migration, expulsion, and/or transport processes of hydrocarbon within kerogen, a prediction of hydrocarbon volumes (e.g., in pore space) and associated benefits/risks of recovery may be improved.

The petroleum system modeling server 220 may include one or more computing devices that generates and provides a petroleum systems model to the kerogen expulsion modeling server 210. In some embodiments, the petroleum systems model may include a model, illustration, and/or data representing different groups of cells associated with different layers in a geological space. As previously discussed, the kerogen expulsion modeling server 210 may use the petroleum systems model to identify kerogens within the geological space, and model hydrocarbon diffusion within the kerogen to a pore space. In some embodiments, the petroleum system modeling server 220 may receive (e.g., from the kerogen expulsion modeling server 210), a model of hydrocarbon diffusion within the kerogen and use the outputs of the model as input to a model that predicts hydrocarbon volumes in the pore space.

The operations management server 230 may include one or more computing devices that may receive any variety of information from the kerogen expulsion modeling server 210 and/or the petroleum system modeling server 220 as inputs to an operation management process. For example, the operations management server 230 may receive (e.g., from the kerogen expulsion modeling server 210) a model of hydrocarbon diffusion within kerogen and may use this model as part of an operation management process (e.g., a process to manage, modify, initiate an oil and gas recovery task based on the results of the model of hydrocarbon diffusion within kerogen, and/or control the operations of drilling equipment used in wellbore drilling, oil and gas recovery, etc.). Additionally, or alternatively, the operations management server 230 may receive (e.g., from the petroleum system modeling server 220), a model that predicts hydrocarbon volumes in a pore space and/or reservoir, and use results from this model as part of the operation management process.

The network 240 may include network nodes and one or more wired and/or wireless networks. For example, the network 240 may include a cellular network (e.g., a second generation (2G) network, a third generation (3G) network, a fourth generation (4G) network, a fifth generation (2G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 240 may include copper transmission cables, optical transmission fibers, wireless transmission, routers, firewalls, switches, gateway computers and/or edge servers.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 3:
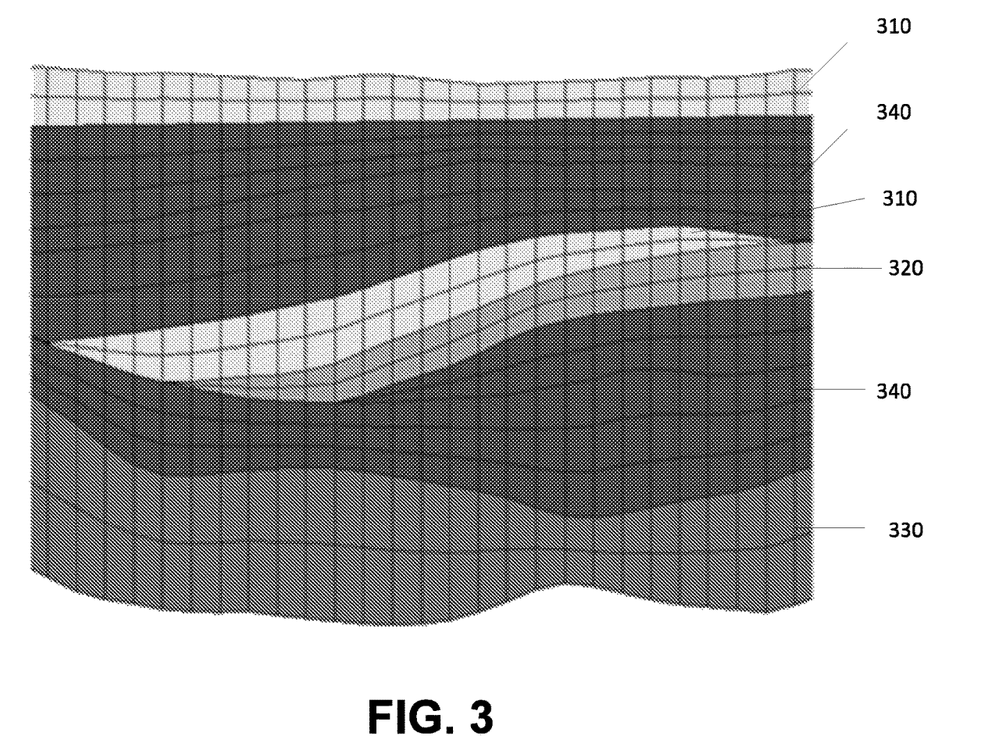
FIG. 3 illustrates a grid used in petroleum system modeling, according to an embodiment.

FIG. 3 illustrates a grid which may be a part of a petroleum system model, according to an embodiment. As described herein, the grid represents subterranean layers in a geological space. The grid includes a first set of cells 310, a second set of cells 320, a third set of cells 330, and a fourth set of cells 340. The approach described herein may be performed for each cell in the grid independently. Cells 310 may represent a sea water layer, cells 320 may represent an accumulation layer, cells 330 may represent a source rock layer, and cells 340 may represent reservoir rock layers.

Some of the layers, represented by the cells in FIG. 3, may include kerogen, while others may not. As described herein, aspects of the present disclosure may model the hydrocarbon expulsion of hydrocarbons that are within kerogen. Thus, the cells of FIG. 3 in which kerogen is present may be further analyzed to model hydrocarbon expulsion within these cells. That is, sub-grids may be created for those cells in the grid of FIG. 3 having kerogen.

Figure 4:
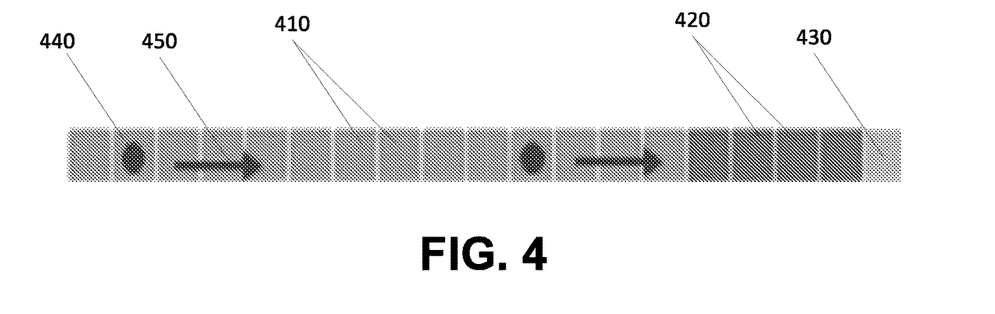
FIG. 4 illustrates a sub-grid of a cell in a petroleum systems model and of hydrocarbon transport processes throughout kerogen, according to an embodiment.

FIG. 4 illustrates a sub-grid of a cell in a petroleum systems model and of hydrocarbon transport processes throughout kerogen, according to an embodiment. For example, FIG. 4 illustrates a sub-grid of one of the cells from the petroleum system modeling grid shown in FIG. 3. More specifically, the sub-grid is of one of the cells of FIG. 3 having kerogen. The sub-grid in FIG. 4 may include sub-cells. More particularly, the sub-cells 410 represent cells inside kerogen, the sub-cells 420 represent cells located in a vicinity between the kerogen and pore space surface, and the sub-cells 430 represents free pore space. The circles 440 and arrows 450 illustrate the movement of hydrocarbons inside the kerogen and towards the pore space (e.g., sub-cells 430). The techniques described herein may model the movement of hydrocarbons inside the kerogen and towards the pore space as illustrated in FIG. 4. More specifically, the techniques described herein may quantify the amount or volume of hydrocarbons that migrate from within kerogen to the pore space.

Figure 5:
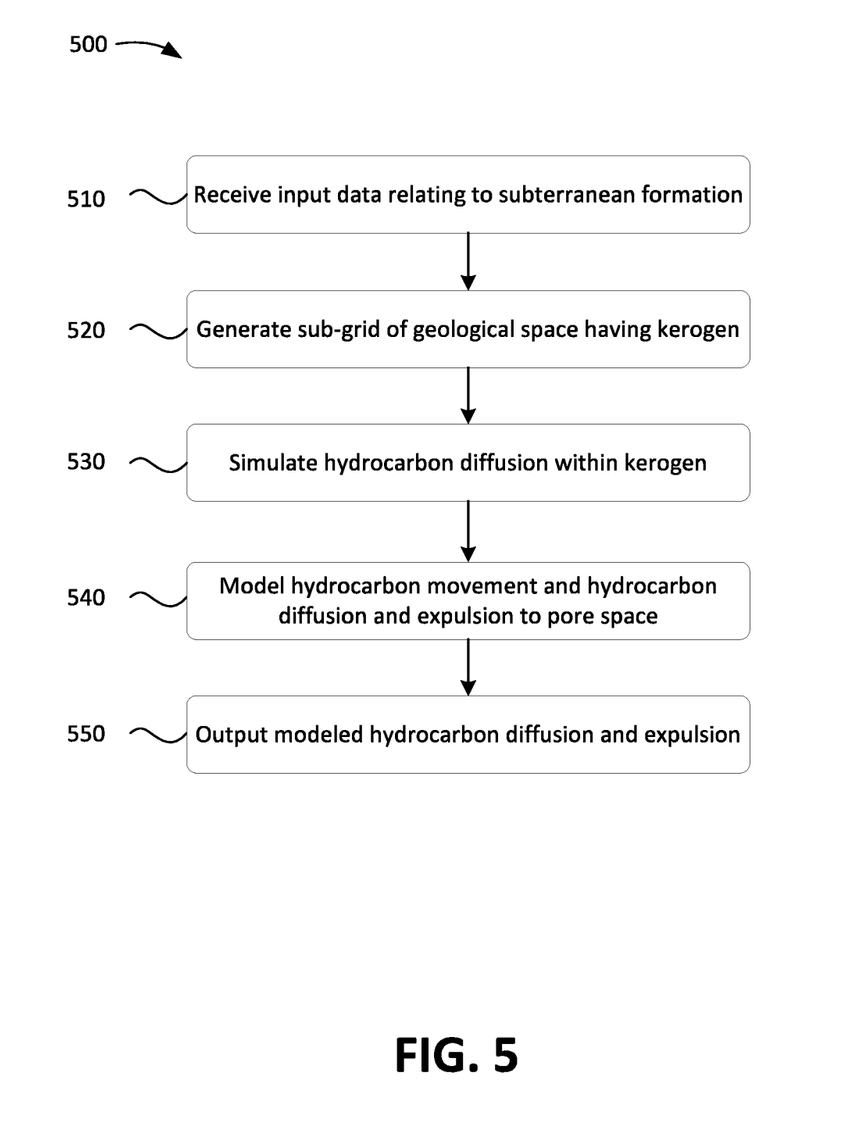
FIG. 5 illustrates an example flowchart of a process for modeling expulsion of hydrocarbons within kerogen.

FIG. 5 illustrates an example flowchart of a process for modeling expulsion of hydrocarbons within kerogen. The blocks of FIG. 5 may be implemented in the environment of FIG. 2, for example, and are described using reference numbers of elements depicted in FIG. 2. The flowchart illustrates the architecture, functionality, and operation of possible implementations of systems, methods, and computer program products according to various embodiments of the present disclosure.

In some embodiments, process 500 may be performed for a particular geological time-step. Process 500 may be repeated or looped for additional geological time-steps (e.g., starting from 500 million years to present day, with time-steps ranging from 0.0001-10 million years).

As shown in FIG. 5, process 500 may include receiving input data relating to subterranean formation for a geological space (as at 510). For example, the kerogen expulsion modeling server 210 may receive input data relating to subterranean formation for a geological space (e.g., input data regarding source rocks and/or other subterranean information for the geological space). Examples of input data that the kerogen expulsion modeling server 210 may receive may include a petroleum systems model for the geological space (e.g., from the petroleum system modeling server 220). For example, the input data may include a petroleum systems model in the form of a grid (e.g., such as the grid of FIG. 3). In some embodiments, the grid may include multiple grid cells that can be separated into one or more (e.g., three) different categories: (i) cells inside the kerogen that are not affected by any surface effects, (ii) cells in the vicinity of the kerogen/pore space surface for which adsorption has a suppressing effect on the diffusion coefficient, and (iii) cells considering the pore space.

Additionally, or alternatively, the input data may include simulated or predicted subterranean data regarding the geological space and/or source rocks in the geological space (e.g., temperature data, rock stress data, porosity, geomechanics data, pressure data, etc.). For example, the kerogen expulsion modeling server 210 may receive the include simulated or predicted subterranean data (e.g., from the petroleum system modeling server 220), or the kerogen expulsion modeling server 210 may itself run simulations on a petroleum systems model of the geological space to determine the simulated or predicted data.

In some embodiments, the input data may include information identifying areas in the geological space having kerogen, and the amounts of hydrocarbon in the kerogen. Additionally, or alternatively, the input data may include information that can be used to calculate hydrocarbon generation in source rocks, as well as hydrocarbon absorption inside kerogen. For example, hydrocarbon generation in source rocks, as well as secondary cracking reactions, may be described by a set of kinetic equations based on the Arrhenius law. The calculated amounts of hydrocarbon may be (a) absorbed inside the kerogen, (b) adsorbed on kerogen/pore space surface, and/or (c) expelled into the pore space. In some embodiments, the kerogen expulsion modeling server 210 may receive information regarding the hydrocarbon generation as part of the input data, or may calculate the hydrocarbon generation using the input data (e.g., more specifically, temperature distribution data).

Process 500 also may include generating a sub-grid of a portion of the geological space having kerogen (as at 520). For example, the kerogen expulsion modeling server 210 may generate a sub-grid of a portion of the geological space having kerogen (e.g., similar to the sub-grid shown in FIG. 4). As an illustrative example, the kerogen expulsion modeling server 210 may generate a sub-grid of one cell in the petroleum systems model (e.g., represented by a grid similar to that shown in FIG. 3) in which the cell has kerogen. As part of the generation of the sub-grid, the kerogen expulsion modeling server 210 may divide the sub-grid into sub-cells, and may insert data representing hydrocarbons into the sub-grid. For example, the kerogen expulsion modeling server 210 may insert data representing hydrocarbons based on the hydrocarbon absorption information (e.g., received as input data at block 510, and/or calculated based on the input data at block 510). Further, the data representing hydrocarbons may include the volume, sizes, etc. of the hydrocarbons. In this way, the sub-grid includes sub-cells with information identifying hydrocarbon locations and amounts within the cells. Thus, the sub-grid is now prepared to be used as a basis for modeling hydrocarbon transport, movement, diffusion, and expulsion. For the sake of simplicity, the sub-grid may be a one-dimensional equidistant grid. However, as will be appreciated, other grid types (e.g., two-dimensional grids or three-dimensional grids) as well as non-equidistant grids may also or instead be used and the techniques described herein are not limited to one-dimensional grids.

Process 500 further may include simulating hydrocarbon diffusion within kerogen (as at 530). For example, the kerogen expulsion modeling server 210 may simulate hydrocarbon within kerogen (e.g., using the sub-grid generated at 520). Diffusion of a hydrocarbon component (e.g., methane) absorbed inside the kerogen may be modeled, for example, by Fick's law of diffusion:

$$\vec{J} = D\vec{\nabla}c \qquad (1)$$

In equation 1, J is the mass flux [kg s$^{-1}$], D is a diffusion coefficient [m$^2$ s$^{-1}$], and c is the mass concentration [kg m$^{-1}$]. Equation 1 may be solved numerically, using the sub-grid generated at 520.

In some embodiments, diffusion coefficients can be considered to be uniform inside the kerogen. Adsorbed amounts can reduce or block the expulsion of hydrocarbons. To model this, the (effective) diffusion coefficients of surface cells may be altered as follows:

$$D = \left(1 - \alpha \frac{m_{ad}}{m_{ad}^{max}}\right)D_0, \qquad (2)$$

In equation 2, $D_0$ represents the original diffusion coefficient, $m_{ad}$ represents the current adsorbed mass, $m_{ad}^{max}$ represents the maximum adsorbed mass, and $\alpha$ represents a parameter controlling the strength of the adsorption blocking. For example, $\alpha=1$ would stop the diffusive transport completely if the adsorption container is completely filled (i.e., $m_{ad}=m_{ad}^{max}$), and $\alpha=0$ yields a model where diffusion and adsorption is completely decoupled. In some embodiments, the diffusion coefficient may also be based on type of kerogen/kerogen properties, and temperature. As described herein, the simulating hydrocarbon diffusion may produce a set of data that may be used to generate a model of hydrocarbon diffusion and expulsion to pore space.

Process 500 also may include modeling the hydrocarbon diffusion and expulsion to pore space (as at 540). For example, the kerogen expulsion modeling server 210 may model the hydrocarbon diffusion and expulsion to pore space based on the simulations executed at block 530. In some embodiments, the modeling may involve converting or packaging the simulated data into a presentable format or model.

Process 500 further may include outputting the modeled hydrocarbon diffusion and expulsion (as at 550). For example, the kerogen expulsion modeling server 210 may output the modeled hydrocarbon diffusion and expulsion to an external system, (e.g., any system or application that is external to the modeling of the hydrocarbon diffusion). As one example, the kerogen expulsion modeling server 210 may output the modeled hydrocarbon diffusion and expulsion to a different application hosted by the kerogen expulsion modeling server 210, the petroleum system modeling server 220, and/or to the operations management server 230.

In some embodiments, the modeled hydrocarbon diffusion and expulsion may be used as an input to an application that predicts hydrocarbon volume or accumulation (e.g., in pore space). As described herein, the operations management server 230 may use the model as part of any variety of operation management process (e.g., a process to manage, modify, initiate an oil and gas recovery task based on the results of the model of hydrocarbon diffusion within kerogen, and/or control the operations of drilling equipment used in wellbore drilling, oil and gas recovery, etc.).

In some embodiments, process 500 may also include visualizing the model of hydrocarbon diffusion. For example, the simulation of hydrocarbon diffusion in the model may be visualized, e.g., over a period of time. Further, the visualizing as described above, the systems and methods disclosed herein provide an efficient and easily controllable approach to include kerogen diffusion effects into a petroleum systems model, which may improve modelling of hydrocarbon expulsion of source rocks.

Figure 6:
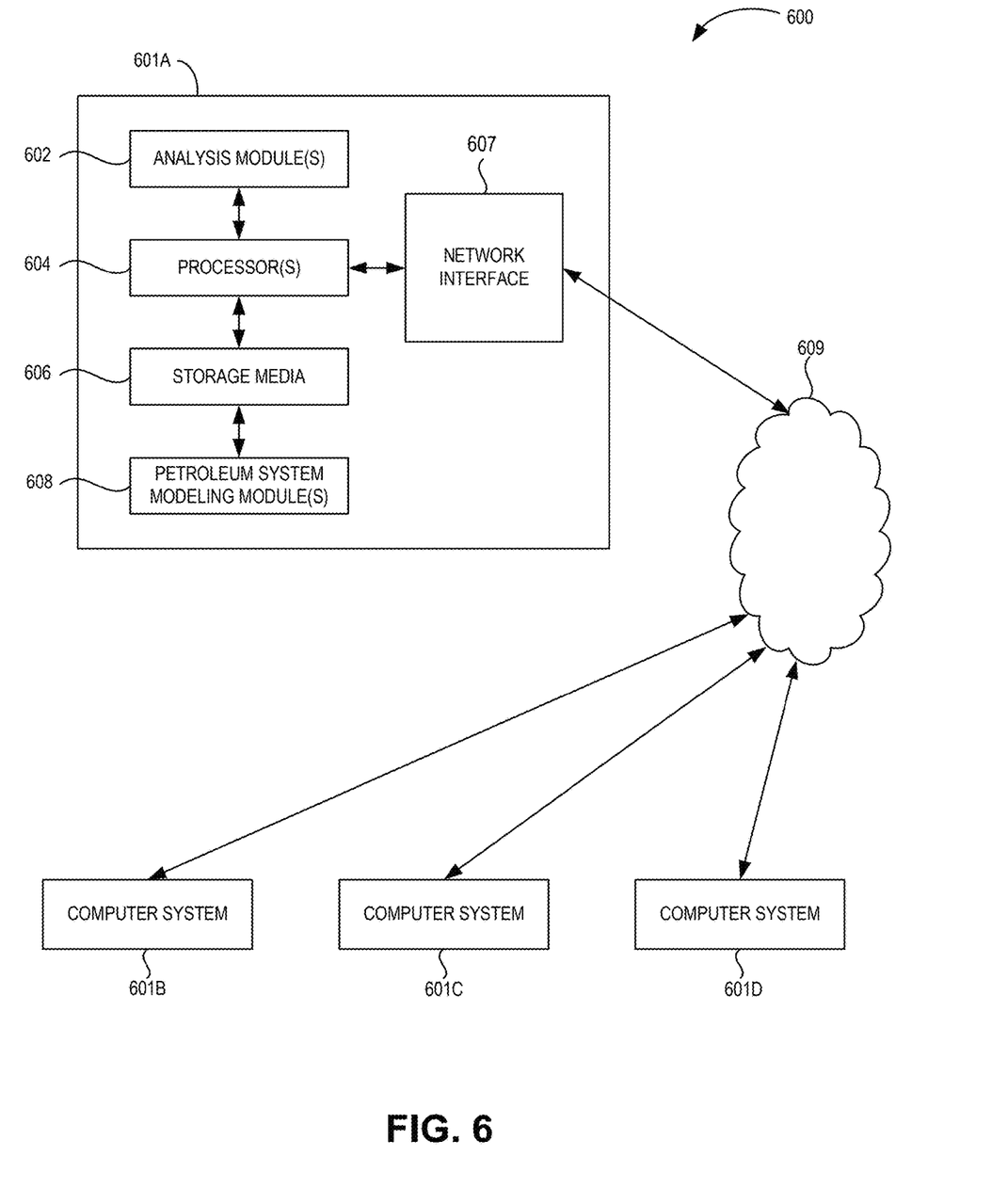
FIG. 6 illustrates a schematic view of a computing system, according to an embodiment.

In some embodiments, the methods of the present disclosure may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis modules 602 that are configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor may include a microprocessor, microcontroller, processor module or subsystem, programmable integrated circuit, programmable gate array, or another control or computing device.

The storage media 606 may be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 600 contains one or more petroleum system modeling module(s) 608 that may perform at least a portion of the method 500. It should be appreciated that computing system 600 is merely one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 600, FIG. 6), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:
1. A method, comprising:
receiving input data representing a subterranean formation;
defining a grid representing the input data, wherein the grid comprises cells;

identifying at least one of the cells in which kerogen is present based on the input data;
generating a sub-grid comprising at least one of the cells in which kerogen is present, wherein the sub-grid comprises:
sub-cells inside the kerogen;
sub-cells located in a vicinity between the kerogen and a pore space surface; or
sub-cells representing pore space;
simulating hydrocarbon movement within the kerogen using the sub-grid;
generating a model of hydrocarbon expulsion to the pore space based on the simulating to quantify an amount or volume of hydrocarbons that migrate from within the kerogen to the pore space; and
utilizing the model in conjunction with a hydrocarbon recovery operation by initiating a hydrocarbon recovery task based on the model, modifying the hydrocarbon recovery task based on the model, or controlling drilling equipment based on the model.

2. The method of claim 1, wherein generating the hydrocarbon expulsion comprises modeling secondary chemical reactions in the subterranean formation.

3. The method of claim 1, further comprising modeling an absorption of hydrocarbons between the kerogen and the pore space, wherein the modeled absorption of hydrocarbons between the kerogen and the pore space is used as part of modeling the hydrocarbon expulsion to the pore space.

4. The method of claim 1, wherein the model of hydrocarbon expulsion is configured to predict volumes of and oil/gas composition of hydrocarbon accumulations.

5. The method of claim 1, wherein simulating hydrocarbon movement comprises adjusting one or more diffusion coefficients.

6. The method of claim 1, further comprising outputting the model of hydrocarbon expulsion to an external system.

7. The method of claim 6, wherein the external system comprises an application to predict hydrocarbon accumulation.

8. A computing system comprising:
one or more processors; and
a memory system comprising one or more non-transitory computer-readable media storing instructions that, when executed by at least one of the one or more processors, cause the computing system to perform operations, the operations comprising:
receiving input data representing a subterranean formation;
defining a grid representing the input data, wherein the grid comprises cells;
identifying at least one of the cells in which kerogen is present based on the input data;
generating a sub-grid comprising at least one of the cells in which kerogen is present, wherein the sub-grid comprises at least one of:
sub-cells inside the kerogen;
sub-cells located in a vicinity between the kerogen and a pore space surface; or
sub-cells representing pore space;
simulating hydrocarbon movement within the kerogen using the sub-grid;
generating a model of hydrocarbon expulsion to the pore space based on the simulating to quantify an amount or volume of hydrocarbons that migrate from within the kerogen to the pore space; and
utilizing the model in conjunction with a hydrocarbon recovery operation by initiating a hydrocarbon recovery task based on the model, modifying the hydrocarbon recovery task based on the model, or controlling drilling equipment based on the model.

9. The system of claim 8, wherein generating the hydrocarbon expulsion comprises modeling secondary chemical reactions in the subterranean formation.

10. The system of claim 8, wherein the operations further comprise modeling an absorption of hydrocarbons between the kerogen and the pore space, wherein the modeled absorption of hydrocarbons between the kerogen and the pore space is used as part of modeling the hydrocarbon expulsion to the pore space.

11. The system of claim 8, wherein the model of hydrocarbon expulsion is configured to predict volumes of and oil/gas composition of hydrocarbon accumulations.

12. The system of claim 8, wherein simulating hydrocarbon movement comprises adjusting one or more diffusion coefficients.

13. The system of claim 8, wherein the operations further comprise outputting the model of hydrocarbon expulsion to an external system.

14. The system of claim 13, wherein the external system comprises an application to predict hydrocarbon accumulation.

15. A non-transitory computer-readable medium storing instructions that, when executed by at least one processor of a computing system, cause the computing system to perform operations, the operations comprising:
receiving input data representing a subterranean formation;
defining a grid representing the input data, wherein the grid comprises cells;
identifying at least one of the cells in which kerogen is present based on the input data;
generating a sub-grid comprising at least one of the cells in which kerogen is present, wherein the sub-grid comprises at least one of:
sub-cells inside the kerogen;
sub-cells located in a vicinity between the kerogen and a pore space surface; or
sub-cells representing pore space;
simulating hydrocarbon movement within the kerogen using the sub-grid;
generating a model of hydrocarbon expulsion to the pore space based on the simulating to quantify an amount or volume of hydrocarbons that migrate from within the kerogen to the pore space; and
utilizing the model in conjunction with a hydrocarbon recovery operation by initiating a hydrocarbon recovery task based on the model, modifying the hydrocarbon recovery task based on the model, or controlling drilling equipment based on the model.

16. The medium of claim 15, wherein generating the hydrocarbon expulsion comprises modeling secondary chemical reactions in the subterranean formation.

17. The medium of claim 15, wherein the operations further comprise modeling an absorption of hydrocarbons between the kerogen and the pore space, wherein the modeled absorption of hydrocarbons between the kerogen and the pore space is used as part of modeling the hydrocarbon expulsion to the pore space.

18. The medium of claim 15, wherein the model of hydrocarbon expulsion is configured to predict volumes of and oil/gas composition of hydrocarbon accumulations.

19. The medium of claim 15, wherein simulating hydrocarbon movement comprises adjusting one or more diffusion coefficients.

20. The medium of claim 15, wherein the operations further comprise outputting the model of hydrocarbon expulsion to an external system, and wherein the external system comprises an application to predict hydrocarbon accumulation.

* * * * *